(12) United States Patent
Flores et al.

(10) Patent No.: US 12,204,393 B2
(45) Date of Patent: *Jan. 21, 2025

(54) INTEGRATED CIRCUIT WITH DEBUGGER AND ARBITRATION INTERFACE

(71) Applicant: Texas Instruments Incorporated, Dallas, TX (US)

(72) Inventors: Jose Luis Flores, Richardson, TX (US); Gary Augustine Cooper, Oakmont, PA (US); Amritpal Singh Mundra, Allen, TX (US); Anthony Lell, San Antonio, TX (US); Jason Lynn Peck, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,037

(22) Filed: Nov. 8, 2023

(65) Prior Publication Data

US 2024/0077925 A1 Mar. 7, 2024

Related U.S. Application Data

(63) Continuation of application No. 17/139,249, filed on Dec. 31, 2020, now Pat. No. 11,847,006.

(Continued)

(51) Int. Cl.
*G06F 11/00* (2006.01)
*G06F 1/3203* (2019.01)
*G06F 11/36* (2006.01)

(52) U.S. Cl.
CPC ........ *G06F 1/3203* (2013.01); *G06F 11/3656* (2013.01)

(58) Field of Classification Search
CPC . G06F 11/2284; G06F 11/3656; G06F 1/3203
See application file for complete search history.

(56) References Cited

U.S. PATENT DOCUMENTS 8,694,830 B2 4/2014 Balkan et al.
9,684,367 B2 6/2017 Hanssen
(Continued)

OTHER PUBLICATIONS

International Search Report for PCT/US2021/012071, mailed Apr. 2, 2021.

*Primary Examiner* — Elmira Mehrmanesh
(74) *Attorney, Agent, or Firm* — Michael T. Gabrik; Frank D. Cimino (57) ABSTRACT

Circuits, systems and methods are provided. A circuit includes a subsystem, an interface, and a debugger. The interface includes power processing and management (PPM) circuitry coupled to the subsystem, and arbitration logic coupled to the PPM circuitry. In operation, the debugger issues a debug request to the arbitration logic to perform a debug operation on the subsystem, and, in response to the debug request, the arbitration logic provides an interrupt associated with the subsystem to the PPM circuitry. The PPM circuitry, in response to the interrupt and a determination that the subsystem is OFF, powers on the subsystem and provides a notification to the arbitration logic indicating that the subsystem is ON. The PPM circuitry also receives a notification from the arbitration logic that the debug operation related to the debug request is complete, and powers off the subsystem in response to that notification.

20 Claims, 6 Drawing Sheets

Related U.S. Application Data

(60) Provisional application No. 62/956,499, filed on Jan. 2, 2020.

(56) References Cited

U.S. PATENT DOCUMENTS

| | | | |
|---|---|---|---|
| 10,012,693 B2 | 7/2018 | Lim et al. | |
| 10,891,207 B2 | 1/2021 | Bhatia et al. | |
| 10,942,838 B2 * | 3/2021 | Schneider et al. | |
| 11,847,006 B2 * | 12/2023 | Flores | G06F 11/3656 |
| 2006/0248395 A1 | 11/2006 | McGowan | |
| 2012/0151264 A1 | 6/2012 | Balkan | |
| 2014/0013157 A1 | 1/2014 | Hopkins | |
| 2015/0052410 A1 | 2/2015 | Hyun | |
| 2015/0082093 A1 | 3/2015 | Sarangi | |
| 2017/0139008 A1 * | 5/2017 | Lim | G01R 31/3177 |

* cited by examiner

FIG. 8

INTEGRATED CIRCUIT WITH DEBUGGER AND ARBITRATION INTERFACE

CROSS-REFERENCE TO RELATED APPLICATIONS

This application claims priority to U.S. patent application Ser. No. 17/139,249, filed Dec. 31, 2020 (now U.S. Pat. No. 11,847,006), which claims the benefit of Provisional Application No. 62/956,499, filed Jan. 2, 2020, each of which is incorporated by reference herein.

BACKGROUND

As new electronic devices are developed and integrated circuit (IC) technology advances, new IC products are commercialized. One example IC product for electronic devices is a system-on-a-chip (SoC) with one or more processor cores. There is an increasing focus on efficiency and productivity in SoC markets. Industries such as factory automation equipment manufacturers, aerospace, defense, power grid infrastructure, building automation, and medical are demanding SoCs with increased reliability. To meet demanding reliability specifications, many SoC designs include embedded solutions while balancing performance, size, and overall cost targets. For SoCs, the reliance on various memory elements and employment of small-geometry silicon process technologies introduce reliability challenges.

SUMMARY

In an example, a circuit, which may be an integrated circuit (IC), is provided. The circuit comprises a subsystem; an interface coupled to the subsystem; and a debugger. The interface includes power processing and management (PPM) circuitry coupled to the subsystem, and arbitration logic coupled to the PPM circuitry. The debugger, which is coupled to the arbitration logic, is configured to issue a debug request to the arbitration logic to perform a debug operation on the subsystem. The arbitration logic is configured to, in response to the debug request, provide an interrupt associated with the subsystem to the PPM circuitry. The PPM circuitry is configured to, in response to the interrupt and in response to determining that the subsystem is in an unpowered state, power on the subsystem and provide a first notification to the arbitration logic indicating that the subsystem is in a powered state. The PPM circuitry is further configured to receive a second notification from the arbitration logic that the debug operation related to the debug request is complete, and power off the subsystem in response to the second notification.

In an example, a system comprises a debugger subsystem including a debug authentication interface; arbitration logic coupled to the debugger subsystem; a power processor coupled to the arbitration logic and the debug authentication interface; and multiple subsystems, each coupled to the arbitration logic and each including a power controller. The arbitration logic is configured to assert an interrupt signal to the power processor in response to a debug request from the debugger subsystem, the debug request specifying a target subsystem of the multiple subsystems. The power processor is configured to, in response to the interrupt signal, determine a power state of the target subsystem, and perform one of a first set of operations and a second set of operations. The first set of operations is performed when it is determined that the power state of the target subsystem is the power-off- state, and the second set of operations is performed when it is determined that the power state of the target subsystem is the power-on-state.

DETAILED DESCRIPTION

As described herein, an integrated circuit (IC) includes an embedded debugger to debug subsystems of the IC. In some example embodiments, the IC includes at least one processor core and memory, where the debugger is an application stored by the memory for execution by the at least one processor core. The IC also includes an interface between the debugger and the subsystems, where the debugger is configured to perform debugging operations on the subsystems via the interface. In some example embodiments, the interface includes: arbitration logic coupled to the debugger; a power processor coupled to the arbitration logic; and a power management network coupled to the power processor. As used herein, a "power processor" is a processor that manages clocks, resets, or other power management tasks of the IC. A power processor may also perform other operations in addition to power management tasks.

In some example embodiments, the arbitration logic is configured to: receive a debug request from the debugger; and generate an interrupt to the power processor responsive to the received debug request. The power processor is configured to: determine a power state of the subsystem related to the debug request responsive to the interrupt; perform a first set of operations related to the debug request if the determined power state of the subsystem related to the debug request is an off-state; and perform a second set of operations related to the debug request if the determined power state of the subsystem related to the debug request is an on-state.

In some example embodiments, the first set of operations include: provide control signals to the power management network to power on the subsystem related to the debug request; send a notification to the arbitration logic to confirm that the subsystem related to the debug request is in an on-state, receive a notification from the arbitration logic that debug operations related to debug request are complete; and provide control signals to the power management network to restore the subsystem related to the debug request to the off-state responsive to the received notification. In some example embodiments, the second set of operations include: send a notification to the arbitration logic to confirm that the subsystem related to the debug request is in an on-state; receive a notification from the arbitration logic that debug operations related to debug request are complete; and maintain the subsystem related to the debug request in the on-state responsive to the received notification.

In some example embodiments, the IC includes a secure microcontroller (MCU) domain (sometimes referred to as an "MCU island") that includes some of the debugger and components of the interface. For example, the secure microcontroller domain may include a processor that executes at least part of the debugger. Also, in some example embodiments, the secure microcontroller domain may include the power processor and the arbitration logic In some example embodiments, the described techniques involve an on-chip emulator to support communications between the secure microcontroller domain and other components of the IC as needed.

In some example embodiments, the IC is an infotainment IC that includes interfaces to support communications with displays, sensors, and/or other peripherals. In some example embodiments, the IC includes an advanced driver assisted systems (ADAS) physical (PHY) interface to support communications with ADAS-compatible peripherals or applications. In other example embodiments, the IC is an industrial application IC with interfaces to support communications with displays, sensors, and/or other peripherals in a factory or industrial application (e.g., factory automation equipment manufacturers, aerospace, defense, power grid infrastructure, building automation, and/or medical use).

In operation, the interface and/or the power processor may track the power states of the subsystems using a system-on-a-chip (SoC) map or look-up table (LUT). When the debugger wants the power processor to activate any of the subdomains, the map or LUT is used by the power processor to determine the power state of the subsystem related to a debug request. Compared to other embedded debugger IC options, the described techniques are less intrusive and avoid complicated hardware to securely perform debug operations. The described embedded debugger IC options leverages an available power processor and interrupt protocol to perform power management of subsystems related to debug operations. In this manner, ICs or SoCs achieve embedded secure debugging of IC subsystems to achieve a target reliability, while meeting performance, size, and overall cost targets.

Figure 1:
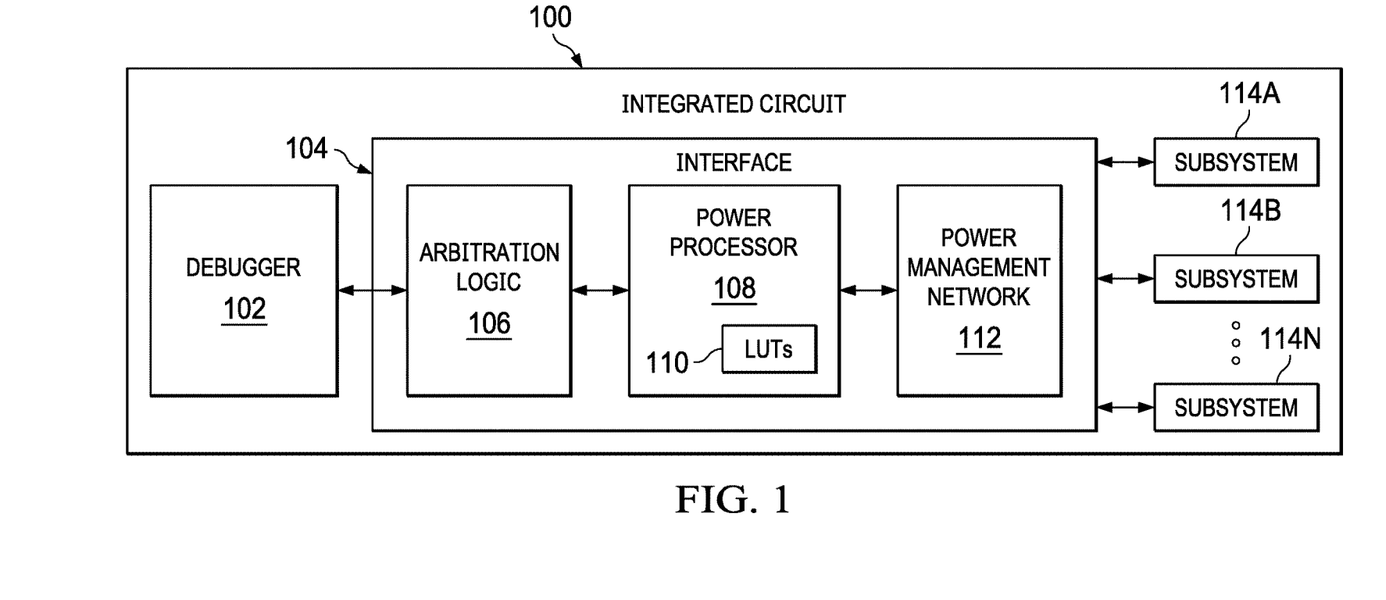
FIG. 1 is a block diagram of an integrated circuit (IC) in accordance with an example embodiment.

FIG. 1 is a block diagram of an IC 100 in accordance with an example embodiment. As shown, the IC 100 includes an interface 104 coupled between a debugger 102 and subsystems 114A-114N. In some example embodiments, the debugger 102 is an application stored in memory and executed by a processor core of the IC 100. Additionally or in the alternative, the debugger 102 may include logic hardcoded to perform at least some of the debug operations described herein. In FIG. 1, the debugger 102 interacts with the subsystems 114A-114N via the interface 104, which includes arbitration logic 106, a power processor 108, and a power management network 112.

In some example embodiments, the arbitration logic 106 is configured to: receive a debug request from the debugger 102; and generate an interrupt to the power processor 108 responsive to the received debug request. The power processor 108 is configured to: determine a power state of the subsystem (e.g., one of the subsystems 114A-114N) related to the debug request responsive to the interrupt; perform a first set of operations related to the debug request if the determined power state of the subsystem related to the debug request is an off-state; and perform a second set of operations related to the debug request if the determined power state of the subsystem related to the debug request is an on-state.

In some example embodiments, the first set of operations of the power processor 108 include: provide control signals to the power management network to power on the subsystem related to the debug request; send a notification to the arbitration logic 106 to confirm that the subsystem related to the debug request is in an on-state, receive a notification from the arbitration logic 106 that debug operations related to debug request are complete; and provide control signals to the power management network 112 to restore the subsystem related to the debug request to the off-state responsive to the received notification. In some examples, the power processor 108 uses LUTs 110, or other organized data, to determine a power state of the subsystem 114A-114N and perform subsequent operations. In some example embodiments, the second set of operations include: send a notification to the arbitration logic 106 to confirm that the subsystem related to the debug request is in an on-state; receive a notification from the arbitration logic 106 that debug operations related to debug request are complete; and maintain the subsystem related to the debug request in the on-state responsive to the received notification.

With the IC 100, the debugger 102 leverages the availability of the power processor 108 and interrupt protocol to perform power management of any of the subsystems 114A-114N related to debug operations. In this manner, the IC 100 achieves embedded secure debugging of the subsystems 114A-114N as needed to achieve a target reliability, while meeting performance, size, and overall cost targets for the IC 100.

Figure 2:
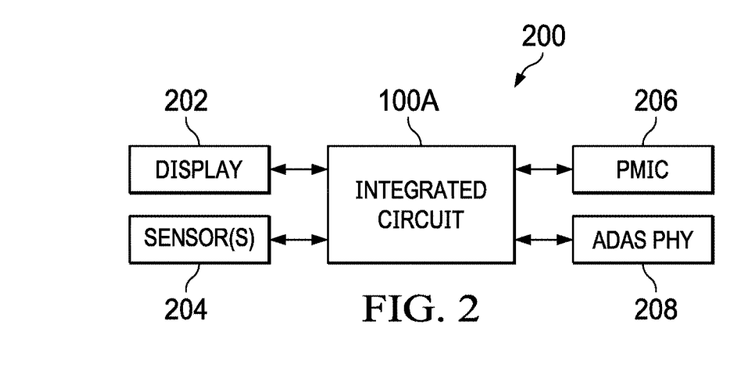
FIG. 2 is a block diagram of a system in accordance with an example embodiment.

FIG. 2 is a block diagram of a system 200 in accordance with an example embodiment. As shown, the system 200 includes an IC 100A (an example of the integrated circuit 100 of FIG. 1). In some examples, the IC 100A is an infotainment IC (e.g., for a vehicle). As shown, the IC 100A is coupled to peripherals such as a display 202, sensor(s) 204, and an ADAS PHY interface 208. In some example embodiments, the ADAS PHY interface 208 is omitted. The system 200 also includes a power management IC (PMIC) 206 coupled to the IC 100A and configured to provide power at least the IC 100A. The PMIC 206 is configured to provide power to the integrated circuit 100A. In some example embodiments, the IC 100A is an infotainment IC (e.g., for use in a vehicle) with debugger operations as described herein. In other example embodiments, the IC 100A is an industrial IC (e.g., for factory automation equipment manufacturers, aerospace, defense, power grid infrastructure, building automation, or medical use). Regardless of the particular use or application, the IC 100A achieves embedded secure debugging of its subsystems as described herein to achieve a target reliability, while meeting performance, size, and overall cost targets for the IC 100.

Figure 3:
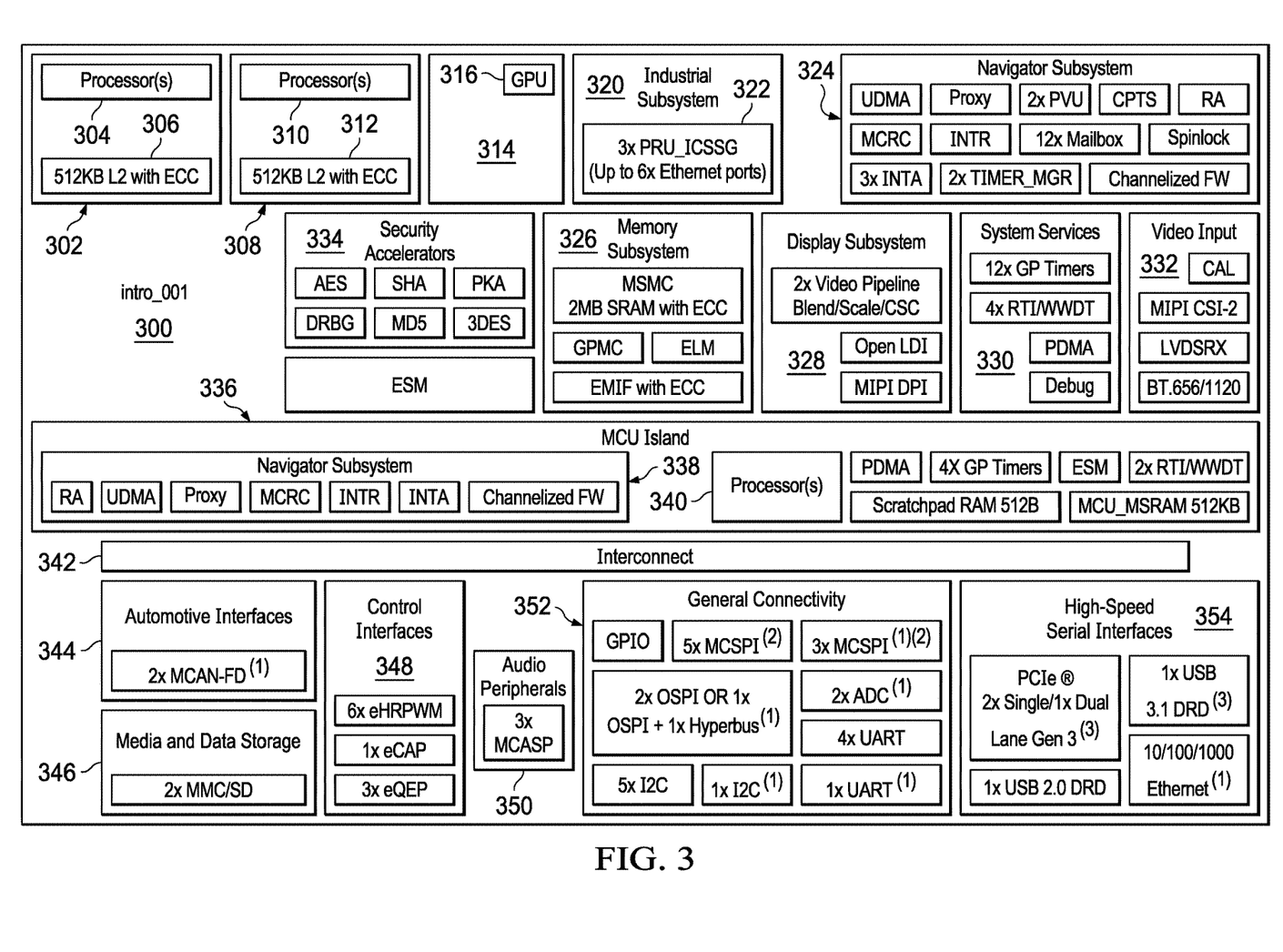
FIG. 3 is a block diagram of an IC in accordance with another example embodiment.

FIG. 3 is a block diagram of an IC 300 (an example of the IC 100 in FIG. 1, or the IC 100A in FIG. 2) in accordance with another example embodiment. In FIG. 3, the IC 300 is an example of an infotainment IC with a debugger, interface, and subsystems as described herein. Relating the IC 100 of FIG. 1 with the IC 300 of FIG. 3, the debugger 102 of FIG. 1 includes debugger operations running in a secure MCU domain or MCU island 336 and other portions of the IC 300 in FIG. 3. The interface 104 of FIG. 1 is part of the MCU island 336 in FIG. 3. Also, the processor cores 302 and 308, and memory subsystem 326 of FIG. 3 are examples of the subsystems 114A-114N of FIG. 1. Other example subsystems include controllers, communication interfaces, programmable circuitry, or application-specific circuitry. The IC 300 of FIG. 3 is for illustration only, and is not intended to limit the described techniques to a particular IC and related set of components.

As shown, the IC 300 includes a first processor core 302 with processor(s) 304 and memory 306 (e.g., a 512 KB L2 cache with error correction code (ECC)). The integrated circuit 300 also includes a second processor core 308 with processor(s) 310 and memory 312 (e.g., a 512 KB L2 cache with ECC). In the example of FIG. 3, the first and second cores 302 and 308 are configured to run software applications, which may be stored at least partially in one or both of the processor cores 302 or 308 (e.g., in the memories 306 and 312) or in a memory subsystem 326. As shown, the memory subsystem 326 includes various example blocks such as a multi-core shared memory controller (MSMC) (e.g., 2 MB static random access memory SRAM with ECC), a general purpose memory controller (GPMC), an extreme learning machine (ELM), an external memory interface (EMIF) with ECC.

In FIG. 3, the IC 300 also includes: a graphics module 314 with a graphics processing unit (GPU) 316; and an industrial subsystem module 320 with microcontrollers 322 (labeled PRU_ICSSG) to support Ethernet ports; and a navigator subsystem 324. In some example embodiments, the navigator subsystem 324 includes an unified direct memory access (UDMA) block, a proxy block, a peripheral virtualization unit (PVU) block, a common platform timestamp (CPTS), ring accelerator (RA) proxy data buffers, memory cyclic redundancy check (MCRC) accelerator, interrupt blocks (INTR and INTA), mailbox block, spinlock block, a timer manager (TIMER_MGR) block, a channelized firmware (FW) block.

As shown, the IC 300 also includes a display subsystem 328. In some example embodiments, the display subsystem 328 includes a video pipeline block (e.g., blend/scale/color space converter or "CSC"), a digital video interface (e.g., open LDI) block, and a MIPI interface and display port interface (MIPI DPI) block. Moreover, the IC 300 includes a system services modules 330. In some example embodiments, the system services module 330 includes general purpose (GP) timers, real-time interrupt (RTI) and windowed watchdog timer (WWDT) block, a peripheral direct memory access (PDMA) block, and a debug block. Additionally, the IC 300 also includes a video input module 332. In some example embodiments, the video input module 332 includes a CAL block, a MIPI CSI-2 block, a low voltage differential signaling receiver (LVDSRX) block, a video processing (e.g., BT.656/1120) block.

In FIG. 3, the IC 300 also includes security accelerators module 334. In some example embodiments, the security accelerators module 334 includes an advanced encryption standard (AES) block, a secure hash standard (SHA) block, a public key accelerator (PKA) block, a deterministic random bit generator (DRBG), a message digest algorithm (MD5) block, and a data encryption standard (3DES) block.

As shown, the MCU island 336 of the IC includes a navigator subsystem 338 and processor(s) 340. In some example embodiments, the navigator subsystem 338 includes an RA block, a UDMA block, a proxy block, a MCRC block, interrupt blocks (INTR and INTA), and a channelized FW block. In one example, the processor(s) 340 within the MCU island 336 may be used as a power processor, and the debugger may interact with the processor 340 to control various signals provided to a subsystem being debugged, such as power, clocks, and/or resets, or to perform other power management tasks. The MCU island 336 also includes various other components including a PDMA block, GP timers, an error signaling module (ESM), an RTI/WWDT block, and memory (e.g., scratchpad RAM 512B and MCU_MSRAM 512 KB). In some example embodiments, the MCU island 336 includes various components related to the techniques described herein, such the debugger 102 and at least some of the interface 104 (e.g., the arbitration logic 106 and the power processor 108) of FIG. 1.

The IC 300 also includes an interconnect 342, which enables communication between the MCU island 336 and other components or subsystems of the IC 300. Example components of the IC 300 include automotive interfaces 344, media and data storage 346, control interfaces 348, and audio peripherals 350. The automotive interfaces 344 include, for example, a controller area network with flexible data rate (MCAN_FD) block. The media and data storage 346 includes, for example, a multimedia card (MMC)/secure digital (SD) card block. The control interfaces 348 includes an enhanced high-resolution pulse width modulation (eHRPWM) block, an enhanced capture (eCAP) block, and an enhanced quadrature encoder pulse (eQEP) block. The audio peripherals 350 include, for example, a multichannel audio serial port (MCASP) block.

As shown, the IC 300 also includes a general connectivity module 352. In some example embodiments, the general connectivity module includes a general purpose input/output (GPIO) block, an octal serial peripheral interface (OSPI) and Hyperbus block, communication interface (e.g., I2C) blocks, multichannel serial port interface (MCSPI) blocks, analog-to-digital converters (ADCs), and universal asynchronous receiver/transmitter (UART) blocks. The IC 300 also includes a high-speed serial interfaces module 354. In some example embodiments, the high-speed serial interfaces module 354 includes a peripheral component interconnect express (PCIe) block, a universal serial bus (USB) 2.0 block, a USB 3.1 block, and an Ethernet block.

With the IC 300, a debugger running in the MCU island 336 leverages the availability of a power processor (e.g., one of the processor(s) 340) and interrupt protocol to perform power management of any of the subsystems (e.g., processor cores 302, 308, the memory subsystem 326, or other subsystems) compatible with debug operations. In this manner, the IC 300 achieves embedded secure debugging of the subsystems as needed to achieve a target reliability, while meeting performance, size, and overall cost targets for the IC 300.

Figure 4:
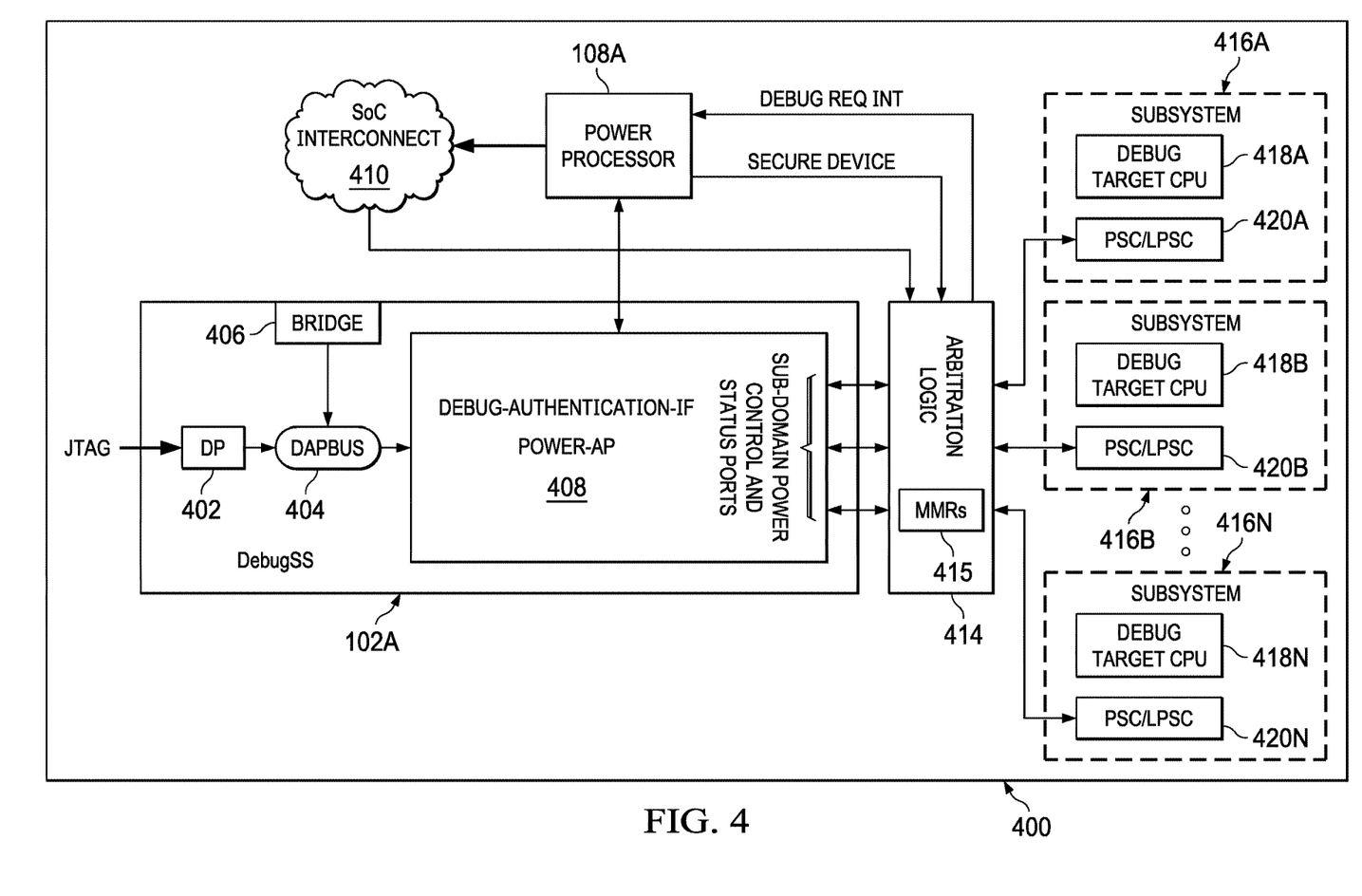
FIG. 4 is a block diagram of an IC in accordance with another example embodiment.

FIG. 4 is a block diagram of an IC 400 (an example of the IC 100 in FIG. 1, the IC 100A in FIG. 2, or the IC 300 in FIG. 3) in accordance with another example embodiment. As shown, the IC 400 includes a debugger subsystem (DebugSS) 102A (an example of the debugger 102 in FIG. 1) coupled to subsystems 416A-416N (examples of the subsystems 114A-114N in FIG. 1) via arbitration logic 414 (an example of the arbitration logic 106 in FIG. 1). The arbitration logic 414 is also coupled to a power processor 108A (an example of the power processor 108 in FIG. 1). In the example of FIG. 4, each of the subsystems 416A-416N includes a debug target central processing unit (CPU) 418A-418N or other target component(s). Each of the subsystems 416A-416N also includes a respective power and sleep controller (PSC) and/or local power and sleep controller (LPSC) module 420A-420N. In some examples, the PSC/LPSC modules 420A-420N are part of a power management network (e.g., the power management network 112) to control clocks and/or power supplies for the subsystems 416A-416N of the IC 400.

More specifically, the debugger subsystem 102A includes a debug pin (DP) interface 402 configured to receive joint test action group (JTAG) communications. The DP interface 402 is coupled to a bus (DAPBUS) 404. As shown, the debugger subsystem 102A also includes a bridge 406 and debug authentication interface (referred to as Power-AP) 408 coupled to the bus 404. In operation, the debug authentication interface 408 is configured to convey debug requests to the arbitration logic 414.

In response to a debug request from the debugger subsystem 102A, the arbitration logic 414 asserts an interrupt (Debug Req Int) to the power processor 108A. The power processor 108A is configured to: determine a power state of the subsystem related to the debug request responsive to the interrupt; and perform a first set of operations to power-up the subsystem related to the debug request if the determined power state of the subsystem related to the debug request is an off-state. In some example embodiments, the first set of operations performed by the power processor 108A includes: provide control signals 413 to a power management network (e.g., a respective one of the PSC/LPSC modules 420A-420N) to power on the subsystem related to the debug request; and send a notification (Secure Device notification) to the arbitration logic 414 to confirm that the subsystem related to the debug request is in an on-state. In some example embodiments, the first set of operations performed by the power processor 108A also include: receive a notification (e.g., using Debug Req Int) from the arbitration logic 414 that debug operations related to debug request are complete; and provide control signals to the power management network (e.g., a respective one of the PSC/LPSC modules 420A-420N) to restore the subsystem related to the debug request to the off-state responsive to the received notification.

In some example embodiments, the power processor 108A is configured to perform a second set of operations if the determined power state of the subsystem related to the debug request is an on-state. In one example, the second set of operations include: send a notification (Secure Device notification) to the arbitration logic 414 to confirm that the subsystem related to the debug request is in an on-state; receive a notification (e.g., using Debug Req Int) from the arbitration logic 414 that debug operations related to debug request are complete; and maintain the subsystem related to the debug request in the on-state responsive to the received notification.

In the example of FIG. 4, the arbitration logic 414 includes memory-mapped registers (MMRs) 415 or other storage to track configuration or status bits related to debug operations. Also, in some example embodiments, the arbitration logic 414 couples to the power processor 108A via an interconnect 410 (labeled SoC interconnect). In the example of FIG. 4, the power processor 108A and the arbitration block 414 provide an interface (e.g., the interface 104 in FIG. 1) to perform debugging on any of the subsystems 416A-416N. With the IC 400, the arbitration logic 414 enables the debugger 102A to leverage the availability of the power processor 108A and an interrupt protocol to perform power management of any of the subsystems 416A-416N related to debug operations of the debugger 102A. In this manner, the IC 400 achieves embedded secure debugging of the subsystems 416A-416N as needed to achieve a target reliability, while meeting performance, size, and overall cost targets for the IC 400.

Figure 5:
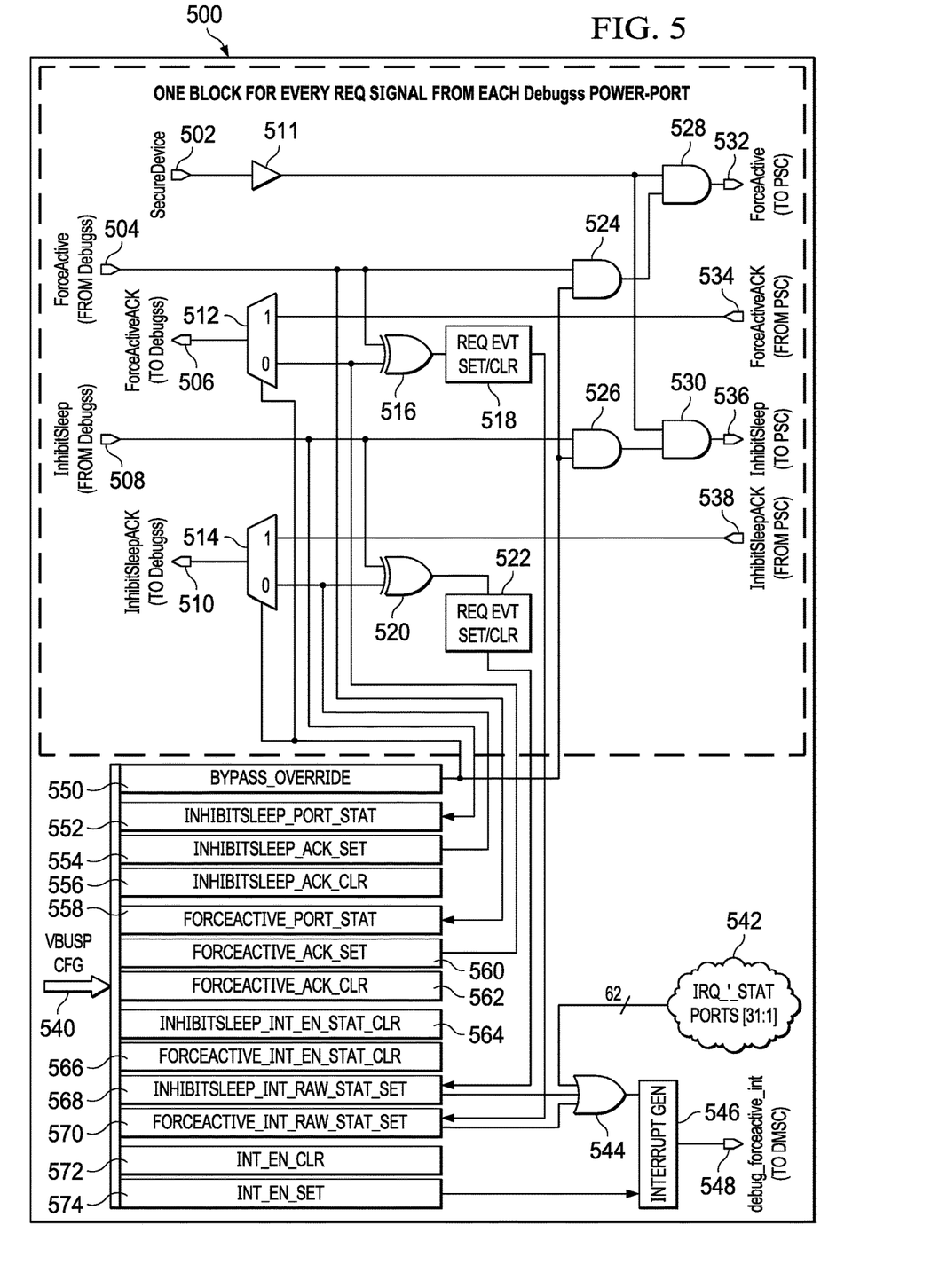
FIG. 5 is a diagram of arbitration logic for an IC with an embedded debugger in accordance with an example embodiment.

FIG. 5 is a diagram of arbitration logic 500 (an example of the arbitration logic 106 in FIG. 1, or the arbitration logic 414 in FIG. 4) for an IC (e.g., the IC 100 in FIG. 1, the IC 100A in FIG. 2, the IC 300 in FIG. 3, or the IC 400 in FIG. 4) with an embedded debugger in accordance with an example embodiment. As shown, the arbitration logic 500 includes inputs 502, 504, 508, 534, and 538. The input 502 is configured to receive notifications (e.g., Secure Device notifications) from a power processor as described herein. The input 504 is configured to receive a control signal (ForceActive) from a debugger (e.g., the debugger subsystem 102A in FIG. 4). The input 508 is configured to receive another control signal (InhibitSleep) from a debugger (e.g., the debugger subsystem 102A in FIG. 4). The input 534 is configured to receive notifications (ForceActiveACK) from a power management network (e.g., a respective one of the PSC/LPSC modules 420A-420N in FIG. 4). The input 538 is configured to receive notifications (InhibitSleepACK) from a power management network (e.g., a respective one of the PSC/LPSC modules 420A-420N in FIG. 4).

As shown, the arbitration logic 500 also includes outputs 506, 510, 532, 536, 548. The output 506 is configured to provide a first type of notification (e.g., ForceActiveACK) to the debugger. The output 510 is configured to provide a second type of notification (e.g., InhibitSleepACK) to the debugger. The output 532 is configured to provide a first type of control signal (e.g., ForceActive) to the power management network (e.g., a respective one of the PSC/LPSC modules 420A-420N in FIG. 4). The output 536 is configured to a first type of control signal (e.g., InhibitSleep) to the power management network (e.g., a respective one of the PSC/LPSC modules 420A-420N in FIG. 4). The output 548 is configured to provide interrupts (debug_forceactive_int) to a power processor (e.g., the power processor 108 in FIG. 1, or the power processor 108A in FIG. 4) as described herein.

In FIG. 5, the arbitration logic 500 includes logic or gates between the different ones of the inputs 502, 504, 508, 534, and 538 and 506, 510, 532, and 536. As shown, the arbitration logic 500 includes a buffer 511 coupled to the input 502. The output of the buffer 511 is one of the inputs of an AND gate 528. The output of the AND gate is provided to the output 532. As shown, the other input to the AND gate 528 comes from the output of another AND gate 524, where one of the input to the AND gate 524 is coupled to the input 504. The other input to the AND gate 524 is coupled to a bypass override register 550 (BYPASS_OVERRIDE). In FIG. 5, the bypass override register 550 is one of various registers 550, 552, 554, 556, 558, 560, 562, 564, 566, 568, 570, 572, and 574 of the arbitration logic 500, which are examples of the MMRs 415 in FIG. 4. In the example of FIG. 5, these registers are coupled to an interface 540, which enables a debugger or other IC components to check or clear configuration and/or status bits related to the operations of the arbitration logic 500.

As shown, the input 504 is also coupled to: a first control signal port status register (FORCEACTIVE_PORT_STAT) 558; and the input of another AND gate 530. The output of the AND gate 530 is coupled to the output 536. The other input of the AND gate 530 comes from the output of another AND gate 526. As shown, one input of the AND gate 526 is coupled to the input 508, and the other input to the AND gate 526 is coupled to the bypass override register 550. As shown, the input 508 is also coupled to a second control signal port state register 552 (INHIBITSLEEP_PORT_STAT).

In the example of FIG. 5, the output 506 is coupled to the output of a multiplexer 512. As shown, the input 534 is coupled to the first input to the multiplexer 512. The second input of the multiplexer 512 is coupled to a first control signal acknowledgement set register (FORCEACTIVE_ACK_SET) 560, and the control signal for the multiplexer 512 is provided by the bypass override block 550. Also, the output 510 is coupled to the output of another multiplexer 514. As shown, the input 538 is coupled to the first input to the multiplexer 514. The second input of the multiplexer 514 is coupled to a second control signal acknowledgement set register (INHIBITSLEEP_ACK_SET) 554, and the control signal for the multiplexer 514 is provided by the bypass override register 550.

The arbitration logic 500 also includes an XOR gate 516 with a first input coupled to the input 504 and a second input coupled to the first control signal acknowledgement set block 560. The output of the XOR gate 516 is coupled to a control block (REQ EVT SET/CLR) 518 configured to provide a signal to a first control signal interrupt status register (FORCEACTIVE_INT_RAW_STAT_SET) 570 to set or clear in interrupt related to the first control signal (ForceActive). The arbitration logic 500 also includes an XOR gate 520 with a first input coupled to the input 508 and a second input coupled to the second control signal acknowledgement set register 554. The output of the XOR gate 520 is coupled to a control block (REQ EVT SET/CLR) 522 configured to provide a signal to a second control signal interrupt status register (INHIBITSLEEP_INT_RAW_STAT_SET) 568 to set or clear an interrupt related to the second control signal (InhibitSleep).

In the example of FIG. 5, the arbitration logic 500 also includes an interrupt generator 546 coupled to the second control signal interrupt state block 568 and the first control signal interrupt state block 570 via an OR gate 544. The OR gate 544 also receives requests from an interrupt request source (IRQ_*_STAT Ports[31:1]) 542 configured to signal when an interrupt request is received at various IC ports. The output of the interrupt generator 546 is coupled to the output 548. In some example embodiment, the interrupt generator 546 is selectively enabled by a control signal from an interrupt enable clear register (INT_EN_CLR) 574.

As shown, the arbitration logic 500 also includes: a second control signal acknowledgement clear register 556 (INHIBITSLEEP_ACK_CLR); a first control signal acknowledgement clear register 562 (FORCEACTIVE_ACK_CLR); a second control signal interrupt enable status clear register 564 (INHIBITSLEEP_INT_EN_STAT_CLR); and a first control signal interrupt enable status clear register 566 (FORCEACTIVE_INT_EN_STAT_CLR). In different example embodiments, the arbitration logic 500 varies with regard to the particular logic, gates, and register used to handle debug requests, interrupts, and notifications as described herein.

Figure 6:
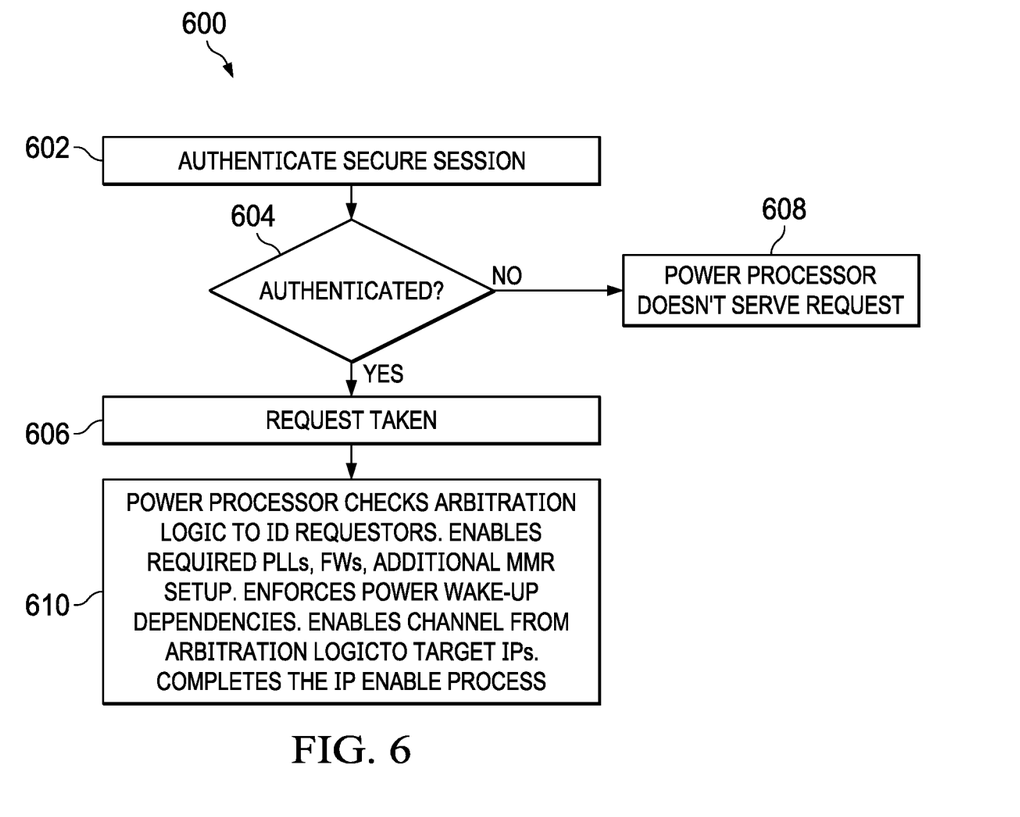
FIG. 6 is a flowchart of embedded debug operations of an IC in accordance with an example embodiment.

FIG. 6 is a flowchart of embedded debug operations 600 of an IC (e.g., the IC 100 in FIG. 1, the IC 100A in FIG. 2, the IC 300 in FIG. 3, or the IC 400 in FIG. 4) in accordance with an example embodiment. As shown, the embedded debug operations 600 include authenticating a secure session at block 602 responsive to request to debug a subsystem as described herein. If authentication is not successful (decision block 604), the power processor does not serve the request at block 608. If authentication is successful (decision block 604), the power processor serves the request at block 606. At block 610, the power processor: checks arbitration logic to ID requestors; enables phase-locked loops (PLLs), firmware (FW), additional MMR setup; enforces power wake-up dependencies; enable channel from arbitration logic to a target subsystem; and complete the subsystem enable process.

Figure 7:
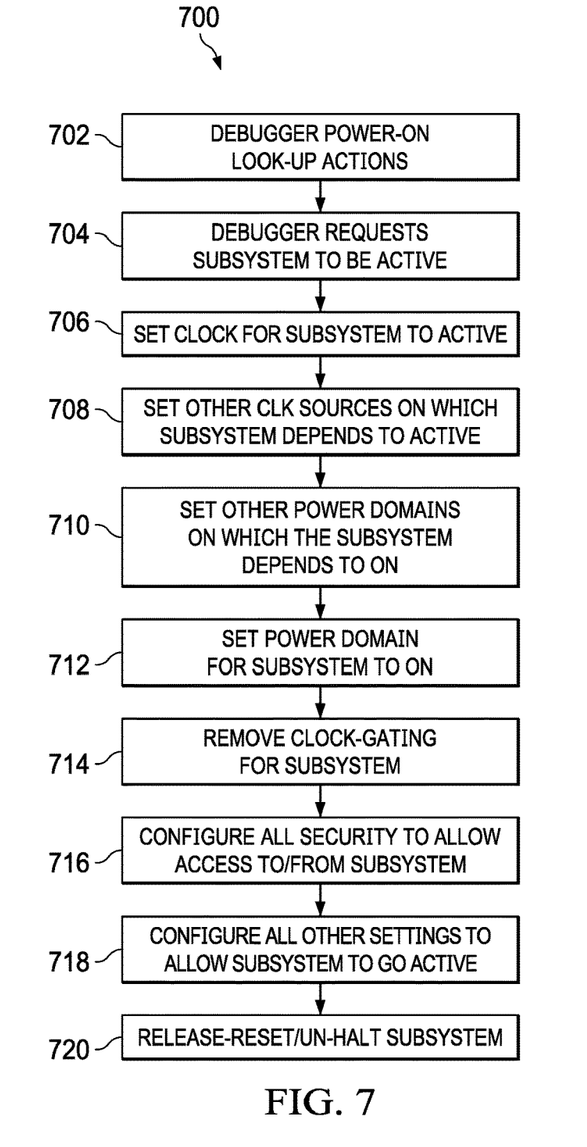
FIG. 7 is a flowchart of power down sequence of look-up table (LUT) operations for an IC in accordance with an example embodiment.

FIG. 7 is a flowchart of power down sequence 700 of LUT operations for an IC (e.g., the IC 100 in FIG. 1, the IC 100A in FIG. 2, the IC 300 in FIG. 3, or the IC 400 in FIG. 4) in accordance with an example embodiment. As shown, the power down sequence 700 includes debugger power-ON look-up actions at block 702. At block 704, the debugger requests one of the subsystems to be active. At block 706, the clock source for requested subsystem active is set. At block 708, other clock sources on which the requested subsystem depends on are set. At block 710, other power domains on which the requested subsystem depends on are set. At block 712, the power domain for the requested subsystem is set. At block 714, clock gating for the requested subsystem is removed. At block 716, all security to allow access to/from the requested subsystem is configured. At block 718, all other setting to allow the requested subsystems to go active are configured. At block 720, the requested subsystem is released, reset, or unhalted. In some example embodiments, a subsystem is disabled (e.g., after a secure debug session) by performing the sequence 700 in reverse.

Figure 8:
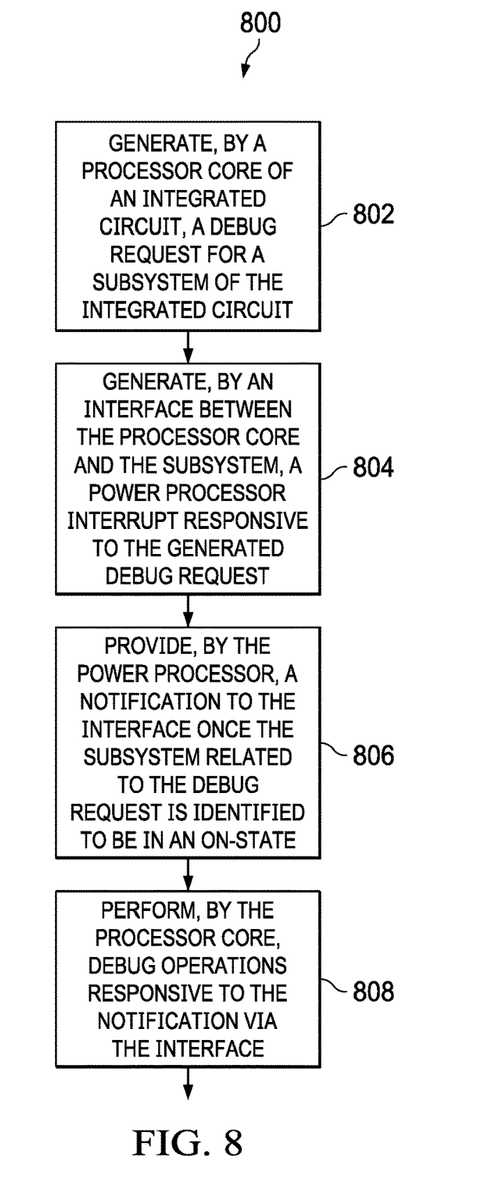
FIG. 8 is a flowchart of a debugging method for an IC in accordance with an example embodiment.

FIG. 8 is a flowchart of a method 800 in accordance with an example embodiment. The method 800 is performed by an IC (e.g., the IC 100 of FIG. 1, the IC 100A of FIG. 2, the IC 300 of FIG. 3, or the IC 400 of FIG. 4). As shown, the method 800 includes generating, by a processor core (e.g., one of the processor cores 302 and 308, the debugger subsystem 102A in FIG. 4) of an integrated circuit, a debug request (e.g., ForceActive or InhibitSleep in FIG. 5) for a subsystem (e.g., one of the subsystems 114A-114N in FIG. 1, or one of the subsystems 416A-416N in FIG. 4) of the integrated circuit at block 802. At block 804, a power processor interrupt is generated, by an interface (e.g., the interface 104 in FIG. 1, the arbitration logic 414 and power processor 108A in FIG. 4) between the processor core and the subsystem, responsive to the generated debug request. At block 806, a notification (e.g., ForceActiveACK or InhibitSleepACK in FIG. 5) is provided, by the power processor, to the interface once the subsystem related to the debug request is identified to be in an on-state. At block 808, debug operations are performed via the interface, by the processor core, responsive to the notification.

In some example embodiments, the method 800 includes additional operations such as: determining, by the power processor, a power state of the subsystem related to the debug request responsive to the power processor interrupt; and performing, by the power processor, a first set of operations to power-up the subsystem if the determined power state of the subsystem related to the debug request is an off-state. In some example embodiments, performing a first set of operations, by the power processor, for the method 800 includes: providing control signals to a power management network of the integrated circuit to power on the subsystem related to the debug request; sending a notification to arbitration logic of the integrated circuit to confirm that the subsystem related to the debug request is in an on-state; receiving a notification from the arbitration logic that debug operations related to debug request are complete; and providing control signals to the power management network to restore the subsystem related to the debug request to the off-state responsive to the received notification. In some example embodiments, the method 800 also includes performing a second set of operations, by the power processor, if the determined power state of the subsystem related to the debug request is an on-state. In some example embodiments, performing, by the power processor, the second set of operations for the method 800 includes: sending a notification to arbitration logic of the integrated circuit to confirm that the subsystem related to the debug request is in an on-state; receiving a notification from the arbitration logic that debug operations related to debug request are complete; and maintain the subsystem related to the debug request in the on-state responsive to the received notification.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A circuit comprising:
    a subsystem;
    an interface coupled to the subsystem, the interface including:
        power processing and management (PPM) circuitry coupled to the subsystem, and
        arbitration logic coupled to the PPM circuitry; and
    a debugger coupled to the arbitration logic; wherein
    the debugger is configured to issue a debug request to perform a debug operation on the subsystem, the debug request being issued to the arbitration logic;
    the arbitration logic is configured to, in response to the debug request, provide an interrupt associated with the subsystem to the PPM circuitry; and
    the PPM circuitry is configured to:
        in response to the interrupt and in response to determining that the subsystem is in an unpowered state, power on the subsystem and provide a first notification to the arbitration logic indicating that the subsystem is in a powered state; and
        receive a second notification from the arbitration logic that the debug operation related to the debug request is complete, and power off the subsystem in response to the second notification.

2. The circuit of claim 1, wherein at least one of the interface and the debugger is part of a secure microcontroller domain.

3. The circuit of claim 1, wherein the subsystem includes a processor and a memory.

4. The circuit of claim 1, further comprising one or more additional subsystems, which together with the subsystem comprise multiple subsystems.

5. The circuit of claim 4, wherein the debug request specifies the subsystem of the multiple subsystems.

6. The circuit of claim 5, wherein the arbitration logic is further configured to:
    set clock sources on which the specified subsystem depends to active; and
    set each power domain on which the specified subsystem depends to active.

7. The circuit of claim 6, wherein the arbitration logic is further configured to remove clock gating for the specified subsystem.

8. The circuit of claim 7, wherein the arbitration logic is further configured to set security to allow access by the interface to and from the specified subsystem.

9. The circuit of claim 1, wherein the circuit is an integrated circuit on which the subsystem, the interface, and the debugger are formed.

10. The circuit of claim 1, wherein the PPM circuitry includes a power processor coupled to the arbitration logic, and a power management network coupled to the power processor.

11. A system comprising:
    a debugger subsystem including an interface;
    arbitration logic coupled to the debugger subsystem;
    a power processor coupled to the arbitration logic and the interface; and
    multiple subsystems, each coupled to the arbitration logic and each including a power controller; wherein
    the arbitration logic is configured to assert an interrupt signal to the power processor in response to a debug request from the debugger subsystem, the debug request specifying a target subsystem of the multiple subsystems,
    the power processor is configured to, in response to the interrupt signal, determine a power state of the target subsystem, and perform one of a first set of operations and a second set of operations, the first set of operations being performed when it is determined that an initial power state of the target subsystem is a power-off-state, and the second set of operations being performed when it is determined that the initial power state of the target subsystem is the power-on-state;
    wherein the debugger subsystem is configured to perform a debug operation related to the debug request on the target subsystem while the target subsystem is in a power-on-state, and
    wherein, after the debug operation is complete, as part of each of the first and second sets of operations, the power processor is configured to provide a control signal to the power controller of the target subsystem to control a current power state of the target subsystem to be the initial power state.

12. The system of claim 11, wherein the first set of operations include:
    provide a control signal to the power controller of the target subsystem to power on the target subsystem, and
    send a notification to the arbitration logic indicating that the target subsystem is in the power-on-state.

13. The system of claim 12, wherein the first set of operations further include:
    receive a notification from the arbitration logic that the debug operation related to the debug request and directed to the target subsystem is complete, and
    in response to receiving the notification from the arbitration logic, provide the control signal to the power controller of the target subsystem to power off the target subsystem.

14. The system of claim 11, wherein the second set of operations include:
    send a notification to the arbitration logic indicating that the target subsystem is in the power-on-state,
    receive a notification from the arbitration logic that the debug operation related to the debug request and directed to the target subsystem is complete, and
    in response to receiving the notification from the arbitration logic, provide the control signal to the power controller of the target subsystem to maintain the target subsystem in the power-on-state.

15. The system of claim 11, wherein the second set of operations include:
- send a notification to the arbitration logic to confirm that the target subsystem related to the debug request is in the power-on-state;
- receive a notification from the arbitration logic that the debug operation is complete; and
- maintain the target subsystem related to the debug request in the power-on-state responsive to the received notification.

16. The system of claim 11, wherein the arbitration logic includes at least one register configured to store information related to debug operations performed on the multiple subsystems.

17. The system of claim 16, wherein the at least one register includes a memory-mapped register configured to store bits related to the debug operations performed on the multiple subsystems.

18. The system of claim 11, further comprising:
- an interconnect configured to couple the power processor to the arbitration logic.

19. The system of claim 11, wherein each of the multiple subsystems includes a central processing unit.

20. The system of claim 11, wherein the arbitration logic includes a plurality of memory-mapped registers and a plurality of logic gates.

\* \* \* \* \*